UNITED STATES PATENT OFFICE.

JAMES HARVEY LESTER, OF ROANOKE, VIRGINIA.

INSECT-DESTROYING COMPOUND.

SPECIFICATION forming part of Letters Patent No. 709,783, dated September 23, 1902.

Application filed April 17, 1902. Serial No. 103,447. (No specimens.)

*To all whom it may concern:*

Be it known that I, JAMES HARVEY LESTER, a citizen of the United States, residing at Roanoke, in the county of Roanoke and State of Virginia, have invented certain new and useful Improvements in Insect - Destroyer Compounds; and I do declare the following to be a full, clear, and exact description of the invention, such as will enable others skilled in the art to which it appertains to make and use the same.

The invention relates to an insect-destroyer compound designed to be placed in holes or sockets bored into the trunk of a tree and to be taken by the sap up into the branches of the tree, and while acting as an insecticide also makes the tree healthy and thrifty.

The compound consists of the following ingredients in approximately the following proportions, by weight: gunpowder, ten ounces; saltpeter, eight ounces; copperas, four ounces; sulfur, sixteen ounces. These ingredients are thoroughly pulverized and mixed.

The tree to be treated has a hole or socket bored therein near the lower end of the trunk, which hole or socket extends to the center or core of the tree. The compound is now placed into this hole or socket, after which the hole or socket may be closed, if desired, by a plug or other suitable means. The compound is taken up by the sap and distributed throughout all the limbs and branches of the tree, and not only serves to act as an insecticide, but as a tonic for the tree.

Having thus described my invention, what I claim, and desire to secure by Letters Patent, is—

A composition for destroying insects comprising the following ingredients in substantially the following proportions, by weight: gunpowder, ten ounces, saltpeter, eight ounces, copperas, four ounces, sulfur, sixteen ounces, substantially as set forth.

In testimony whereof I have hereunto set my hand in presence of two subscribing witnesses.

JAMES HARVEY LESTER.

Witnesses:
   H. B. DANIEL,
   W. L. MUSE.